US012370583B2

(12) United States Patent
Nibhanipudi

(10) Patent No.: US 12,370,583 B2
(45) Date of Patent: Jul. 29, 2025

(54) AIR DUCT CLEANING APPARATUS

(71) Applicant: Kumara V. Nibhanipudi, Scarsdale, NY (US)

(72) Inventor: Kumara V. Nibhanipudi, Scarsdale, NY (US)

( * ) Notice: Subject to any disclaimer, the term of this patent is extended or adjusted under 35 U.S.C. 154(b) by 0 days.

(21) Appl. No.: 18/386,392

(22) Filed: Nov. 2, 2023

(65) Prior Publication Data

US 2025/0144679 A1 May 8, 2025

(51) Int. Cl.

*B08B 9/045* (2006.01)
*A46B 13/02* (2006.01)
*A47L 9/02* (2006.01)
*A47L 9/24* (2006.01)
*B08B 9/035* (2006.01)

(52) U.S. Cl.

CPC .............. *B08B 9/045* (2013.01); *A46B 13/02* (2013.01); *A47L 9/02* (2013.01); *A47L 9/248* (2013.01); *B08B 9/035* (2013.01); *A46B 2200/3013* (2013.01); *B08B 2209/032* (2013.01); *B08B 2209/04* (2013.01)

(58) Field of Classification Search

CPC ......... B08B 9/035; B08B 9/051; B08B 9/053; B08B 9/027; B08B 5/04–046; B08B 9/04–045; A46B 2200/3013; A47L 9/02; A47L 9/248; B65D 2585/6845; B65D 2585/6847; B65D 2585/6805; B65D 2585/6815

USPC .......... 15/304, 309, 310–312.2, 406, 104.05; 134/22.11

See application file for complete search history.

(56) References Cited

U.S. PATENT DOCUMENTS 2,431,089 A * 11/1947 Therrien ................. B08B 9/045 15/104.33
4,666,530 A * 5/1987 Houser ................... E03F 9/005 15/104.095

(Continued)

FOREIGN PATENT DOCUMENTS

WO WO-2009125894 A1 * 10/2009 ......... G02B 23/2484

OTHER PUBLICATIONS

PE2E Translation WO2009125894; Apparatus to Inspect the Inside of Pipe; Hwang, In-Cheol; Oct. 15, 2009 (Year: 2009).*

(Continued)

*Primary Examiner* — Brian D Keller
*Assistant Examiner* — Sidney D Full
(74) *Attorney, Agent, or Firm* — MaxGoLaw PLLC

(57) ABSTRACT

A duct cleaning system includes a flexible vacuum hose having a proximal end configured to couple to a vacuum source, a flexible drive shaft having a proximal end configured to couple to a rotating motor, and a distal end configured to couple to a cleaning attachment, and a flexible camera line having a proximal end configured to couple to a power source and a distal end provided with a camera. The distal ends of the vacuum hose, the drive shaft, and the camera line configured to be fed into and moved along a duct to be cleaned, with the vacuum hose delivering a vacuum to the duct to suction up and collect particles and debris in the vacuum source, the drive shaft and cleaning attachment rotating within the duct to be cleaned to loosen particles and debris, and the camera line providing visualization of the duct during the cleaning process.

20 Claims, 2 Drawing Sheets

(56) References Cited

U.S. PATENT DOCUMENTS

| | | | | | |
|---|---|---|---|---|---|
| 4,792,363 | A * | 12/1988 | Franklin, Jr. | B08B 5/04 | 134/8 |
| 5,003,998 | A * | 4/1991 | Collett | B08B 9/045 | 134/22.12 |
| 5,584,093 | A * | 12/1996 | Melendres | B08B 9/047 | 134/113 |
| 5,735,016 | A * | 4/1998 | Allen | B08B 9/047 | 134/113 |
| 9,494,318 | B2 * | 11/2016 | Meredith | F23J 3/026 | |
| 2006/0266134 | A1 * | 11/2006 | MacMillan | F16L 55/30 | 73/865.8 |
| 2021/0164601 | A1 * | 6/2021 | Warren | B65H 75/4484 | |
| 2021/0268557 | A1 * | 9/2021 | Newth | F16C 1/04 | |
| 2022/0373258 | A1 * | 11/2022 | Miller | F26B 5/14 | |

OTHER PUBLICATIONS

Holikme Dryer Vent Cleaner Kit 32 Feet Dryer Cleaning Tools, Include Dryer Vent Brush, Omnidirectional Blue Dryer Lint Vacuum Attachment, Dryer Lint Trap Brush, Vacuum & Dryer Adapters; www.amazon.com/Holikme-Cleaning-Remover-Extends-Synthetic/dp/B07TWFJQWH/ref=cm_cr_arp_d_product_top (Year: 2019).*

Vevor Sewer Camera, 100 ft/30 m, 7" Screen Pipeline Inspection Camera with DVR Function, Waterproof IP68 Camera, 12 pcs Adjustable LEDs, with a 16 GB SD Card for Sewer Line, Duct Drain Pipe Plumbing; www.amazon.com/VEVOR-Sewer-Camera-100-Inspection/dp/BOBZ4M8HZL (Year: 2023).*

Holikme Dryer Vent Cleaner Kit, Dryer Cleaning Tools, Include Dryer Vent Brush, Omnidirectional Blue Dryer Lint Vacuum Attachment, Dryer Lint Trap Brush, Vacuum & Dryer Adapters; www.amazon.com/ Holikme -Cleaning-Remover-Extends-Synthetic/dp/B07TWFJQWH/ref=cm_cr_arp_d_product_top?ie=UTF8&th=1 (Year: 2019).*

* cited by examiner

AIR DUCT CLEANING APPARATUS

FIELD OF THE INVENTION

The present invention relates to an air duct cleaning apparatus, and more particularly to an air duct cleaning apparatus that is easy to transport and store without tangling.

BACKGROUND OF THE INVENTION

Ducts within a home or other setting typically receive air from a forced air source. The forced air is often filtered, but can nevertheless contain contaminants that are blown into the ventilation ducts. Such contaminants include dust, textile fibers, pollen, hair, skin flakes, residue of chemical and household products, cat and dog dander, decaying organic matter, dust mites, bacteria, fungi, viruses, and a variety of other contaminants. These contaminants pose health hazards to persons with allergies, asthma, or respiratory disorders and diseases. Once such particles are lodged into a duct system, it is possible for the particles to be forced back from the duct system into the living space of a home, office, or building when the ventilation system is actuated. Thus, these ducts require regular cleaning.

A variety of different cleaning systems have been employed to clean such enclosed spaces. For example, some existing systems include a shaft having a rotating brush thereon that is pushed through a duct system. The turning of the brush dislodges particles from within the duct. Such systems typically then blow the released dust and particles to a low point within the duct system where, either via an access point provided or cut into the system, the collected dust and particles are removed from the system with a vacuum. Such systems tend to cause additional messes given that blowing the dislodged particles and dust through the system has a potential for blowing the dust and particles out of the duct via vents. Such systems are also bulky and cumbersome, requiring separate equipment for cutting an access point in a duct to retrieve the dislodged particles as well as a separate vacuum for such collection.

Another existing typical system employs a vacuum hose communicating with a vacuum source. At one end of the vacuum hose is a nozzle having a rotating brush thereon. Extending through the vacuum hose is a flexible metal shaft that rotates the brush. A motor turns the metal shaft. When the motor and vacuum source are actuated, the brush turns and dust and other particles are suctioned through the nozzle into the vacuum hose. The turning of the brush dislodges particles from within an enclosed space, while the suctioning of the hose removes the particles from the space. Even these typical designed systems have various drawbacks. For example, the flexible metal shaft typically rotates within a plastic vacuum hose. As the vacuum hose is inserted within an enclosed space, the metal shaft can contact the hose while the shaft is rotating. In addition, the force created by the motor to drive the shaft is required to extend along the length of the vacuum hose to the rotating brush, stressing the drive motor. The flexible metal shaft can also add weight and inflexibility to the hose. Furthermore, the rotating shaft can typically be viewed through holes in the nozzle. The nozzle holes are designed to allow particles through the holes and into the vacuum hose. However, it is possible that hair, string, fingers, or other objects can be fed within the holes and contacted by high speed rotating shaft. A typical version of such a rotating shaft and nozzle combination features longitudinal safety bars extending across the holes, but a small finger or hair can nevertheless be extended through the holes past the bars and contact the rotating shaft, possibly winding around the rotating shaft. The rotating shaft being positioned within the vacuum hose also limits the size of debris that can be suctioned up and passed through the vacuum hose.

Another problem within the art is that vacuum assemblies employed for pipe and duct cleaning tend to be large and bulky, requiring that a bulky vacuum source be brought within an individual's home or other building and dragged behind a vacuum hose in order to perform the desired cleaning.

Thus, there exists a need for an improved device for cleaning within an enclosed space, such as a duct, pipe or chimney.

BRIEF DESCRIPTION OF THE DRAWINGS

The present invention is further detailed with respect to the following figures that depict various aspects of the present invention.

SUMMARY OF THE INVENTION

Figure 1A:
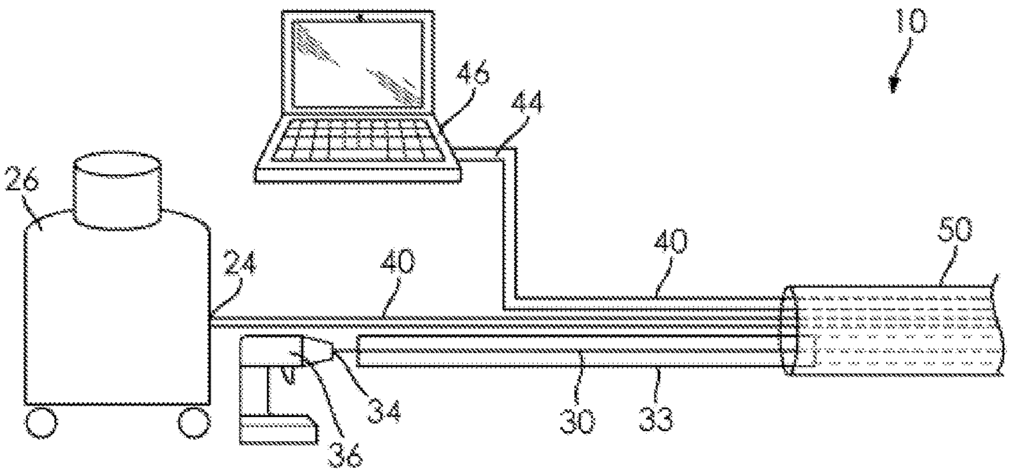
FIG. 1A is a drawing showing side view of a duct cleaning system according to embodiments of the present invention at the proximal end thereof.
Figure 1B:
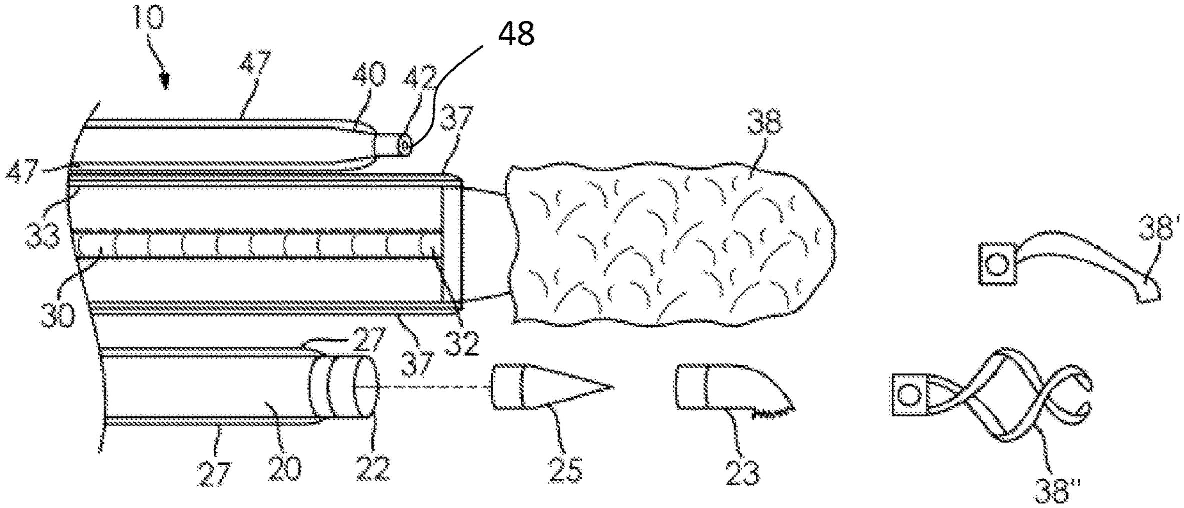
FIG. 1B is a drawing showing a side view of a duct cleaning system according to embodiments of the present invention at the distal end thereof.
Figure 2:
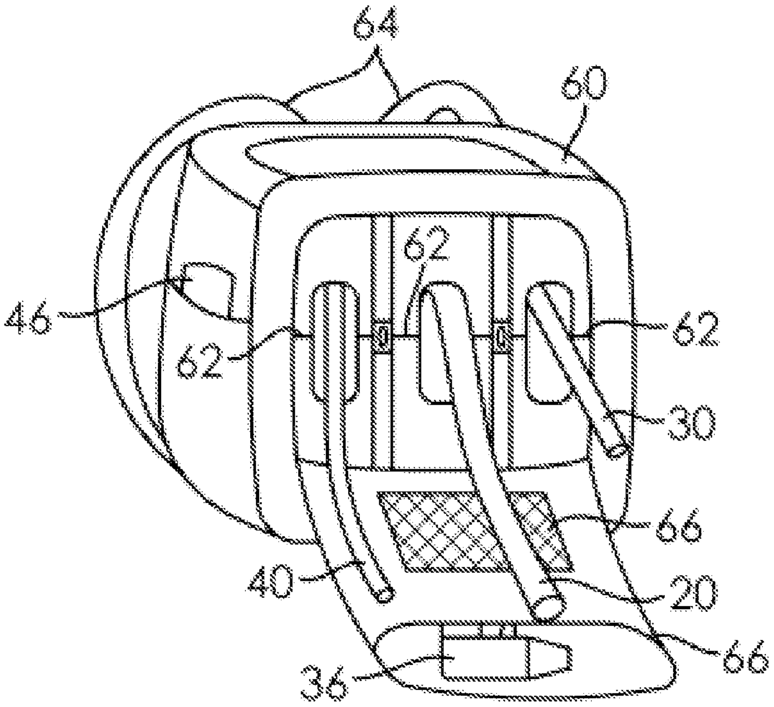
FIG. 2 is a perspective view showing a carrying case of a duct cleaning system according to embodiments of the present invention.

The present invention provides a duct cleaning system that includes a flexible vacuum hose having a distal end and a proximal end, the proximal end of the vacuum hose configured to couple to a vacuum source; a flexible drive shaft having a distal end and a proximal end, the proximal end of the drive shaft configured to couple to and be rotatably driven by a motor, the distal end of the drive shaft configured to couple to a cleaning attachment; and a flexible camera line having a distal end and a proximal end, the proximal end configured to couple to a power source, the distal end provided with a camera. The distal end of the vacuum hose, the distal end of the drive shaft, and the distal end of the camera line are configured to be fed into and moved along a duct to be cleaned. The vacuum hose delivers a vacuum to the duct to be cleaned. The drive shaft and cleaning attachment are configured to rotate within the duct to be cleaned. The camera line provides visualization of the duct to be cleaned.

DESCRIPTION OF THE INVENTION

The present invention has utility as improved device for cleaning within an enclosed space, such as a duct, pipe or chimney. The device is part of a duct cleaning system that is easy to transport and store without tangling.

The present invention will now be described with reference to the following embodiments. As is apparent by these descriptions, this invention can be embodied in different forms and should not be construed as limited to the embodiments set forth herein. Rather, these embodiments are provided so that this disclosure will be thorough and complete, and will fully convey the scope of the invention to those skilled in the art. For example, features illustrated with respect to one embodiment can be incorporated into other embodiments, and features illustrated with respect to a particular embodiment may be deleted from the embodiment. In addition, numerous variations and additions to the embodiments suggested herein will be apparent to those skilled in the art in light of the instant disclosure, which do not depart from the instant invention. Hence, the following specification is intended to illustrate some particular embodiments of the invention, and not to exhaustively specify all permutations, combinations, and variations thereof.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Unless indicated otherwise, explicitly or by context, the following terms are used herein as set forth below.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

According to embodiments, a duct cleaning system 10 includes a flexible vacuum hose 20 having a distal end 22 and a proximal end 24, a flexible drive shaft 30 having a distal end 32 and a proximal end 34, and flexible camera line 40 having a distal end 42 and a proximal end 44. The proximal end 24 of the vacuum hose 20 is configured to couple to a vacuum source 26. The proximal end 34 of the drive shaft 30 is configured to couple to and be rotatably driven by a motor 36. The distal end 32 of the drive shaft 30 is configured to couple to a cleaning attachment 38. The proximal end 44 of the camera line 40 is configured to couple to a power source 46. The distal end 42 of the camera line 40 is provided with a camera 48. The distal end 22 of the vacuum hose 20, the distal end 32 of the drive shaft 30, and the distal end 42 of the camera line 40 are configured to be fed into and moved along a duct of an HVAC system that is to be cleaned. The vacuum hose 20 is configured to apply vacuum suction to the duct to be cleaned, suctioning up particles and debris from within the duct. The drive shaft 30 and the cleaning attachment 38 coupled to a distal end 32 thereof are configured to rotate within the duct to be cleaned in order to dislodge particulate and debris from the walls of the duct. The camera line 40 and the camera 48 provided on the distal end 42 thereof is configured to provide visualization of the duct during the cleaning process.

According to embodiments, the vacuum hose 20, the drive shaft 30, and the camera line 40 are each independently 20 to 100 feet long from the distal end to the proximal end of each, respectively. Each of the vacuum hose 20, the drive shaft 30, and the camera line 40 are each flexible allowing for bending and movement within the duct system, yet resilient such that each of the vacuum hose 20, the drive shaft 30, and the camera line 40 are each independently can be easily pushed and fed through the duct system with ease.

According to embodiments, the vacuum hose 20, the drive shaft 30, and the camera line 40 are each independently are loosely coupled together by at least one slidable collar 50 position along the length of the vacuum hose 20, the drive shaft 30, and the camera line 40 are each independently between the distal end and proximal end of each of the vacuum hose 20, the drive shaft 30, and the camera line 40. This allows for each of the vacuum hose 20, the drive shaft 30, and the camera line 40 to be moved independently from one another, rather than requiring that all be moved along the duct together. For example, the camera line 40 may be moved further along the duct to visualize the extent of dust and debris in a particular area of the duct, then the vacuum tube 30 might be moved further ahead of the drive line 20 to do an initial vacuuming pass. Next the drive shaft 20 may be advanced to loosen particulate from the walls of the duct, the vacuum tube 30 can be moved to suction up the loosened debris, and finally the camera line 40 may be independently moved for a final inspection of the duct. According to embodiments, the vacuum hose 20, the drive shaft 30, and the camera line 40 are each separately provided in one of a first color, a second color, and a third color, respectively, with each of the first color, the second color, and the third color being visually distinct from one another, in order to enable a user to easily move a desired line independently from the others.

According to embodiments, the vacuum hose 20, the drive shaft 30, and the camera line 40 are each independently provided with a steering mechanism 27, 37, 47 at the distal end 22, 32, 42 thereof. The steering mechanisms 27, 37, 47 are configured to steer the direction of the distal end 22, 32, 42 of each of the vacuum hose 20, the drive shaft 30, and the camera line 40, respectively. According to embodiments, the steering mechanisms 27, 37, 47 include at least one steering line that extends from the distal end 22, 32, 42 of each of the vacuum hose 20, the drive shaft 30, and the camera line 40 back to the proximal ends 24, 34, 44 of each of the vacuum hose 20, the drive shaft 30, and the camera line 40. These steering line are accessible by a user and are configured to independently steer the direction of the distal ends 24, 34, 44 of each of the vacuum hose 20, the drive shaft 30, and the camera line 40 based on force applied to the respective steering lines near the proximal ends 24, 34, 44 of each of the vacuum hose 20, the drive shaft 30, and the camera line 40. A steering line may be provided on each of the top, bottom, right side, and left side of each of the distal ends 24, 34, 44 of the vacuum hose 20, the drive shaft 30, and the camera line 40. Pulling on the top steering line moves the distal end 22, 32, 42 up within the duct. Pulling on the bottom steering line moves the distal end 22, 32, 42 down within the duct. Pulling on the right side steering line moves the distal end 22, 32, 42 right within the duct. Pulling on the left side steering line moves the distal end 22, 32, 42 left within the duct.

As noted above, the proximal end 24 of the vacuum hose 20 is configured to couple to a vacuum source 26 in order to suction up debris and particles within the duct via the distal end 22 of the vacuum tube 20. According to embodiments, the vacuum source 26 is a portable vacuum such as any household or commercial vacuum machine. According to embodiments, the distal end of the vacuum tube 20 is configured to attach to a vacuum nozzle 25 or a vacuum brush 23, which may be used as needed based on the conditions of a particular duct being cleaned. Debris and particles suctioned up at the distal end 22 of the vacuum hose 20 are transported via the vacuum suction through length of the vacuum tube 20 and are then collected in the vacuum source 26.

The proximal end 34 of the drive shaft 30 is configured to couple to and be rotatably driven by a motor 36. According to embodiments, the motor 36 includes a clutch and a transmission such that in the event the cleaning attachment becomes stuck within the enclosed duct, the clutch disengages, and such that the motor 36 does not burn out or continue to turn the cleaning attachment 38. The motor 36 of the present invention may be bi-directional. According to embodiments, the motor 36 that drives the drive shaft 30 is a handheld drill configured to couple to the proximal end 34 of the drive shaft 30. As noted above, the distal end 32 of the drive shaft 30 is configured to couple to a cleaning attachment 38. The motor 36 receives power from a power source, such as (i) an electrical cord configured to electrically couple to an outlet; or (ii) a battery, for example. Thus, the motor 36 can be battery operated or operated through the use of an electrical cord. In one embodiment the motor 36 comprises a battery operated, cordless drill-driver, such as a 12 Volt drill-driver.

The distal end of motor 36 is configured to be coupled to the proximal end 34 of the drive shaft 30, and the distal end 32 of the drive shaft 30 is configured to be coupled to the proximal end of a cleaning attachment 38. Thus, actuation of the motor 36 causes the cleaning attachment 38 to rotate, which removes particles from surfaces contacted by cleaning attachment 38.

According to embodiments, the cleaning attachment is a brush 38, a scrapper 38', or a roto-rooter 38". According to embodiments, the drive shaft 30 is provided in a sheath 33 in which the drive shaft 30 is free to rotate. The sheath 33 isolates the rotating drive shaft from the vacuum tube 20 and the camera line 40 to avoid tangling or catching on the drive shaft 30. The sheath 33 also protects the drive shaft 30 from getting tangled in hair or thread or other debris that may be inside the duct. The sheath 33 also provides a layer of protection for a user in that it prevents a user from getting hair or a finger stuck or pinched by the drive shaft 30 as it rotates.

As noted above, the proximal end 44 of the camera line 40 is configured to couple to a power source 46 and the distal end 42 of the camera line 40 is provided with a camera 48. According to embodiments, the power source 46 is a portable computing device, such as a laptop, smartphone, or tablet. According to embodiments, the portable computing device power source 46 includes a screen configured to display the duct to be cleaned. According to embodiments, the camera 48 provide visualization of the duct via a hardwire connection or via Wi-Fi. According to embodiments, the distal end 42 of the camera line 40 is additionally provided with a light configured to illuminate the duct to be cleaned.

According to embodiments, the system 10 additionally includes a carrying case 60 that is configured to contain the vacuum hose 20, the drive shaft 30, the camera line 40, and the power source 46. According to embodiments, the carrying case 60 includes spools 62 within an enclosed volume therein that are each configured to spin so that the vacuum hose 20, the drive shaft 30, the camera line 40 can be wrapped up and stored within the carrying case without tangling. According to embodiments, the carrying case 60 includes carrying straps 64, such as back pack straps so that the system 10 may be easily carried from place to place. According to embodiments, the carrying case 62 includes at least one compartment 66 to hold components and accessories of the system, including the power source 46, the motor 36, such as a handheld drill, the collar 50, the cleaning attachments 38, the vacuum nozzle 25 or the vacuum brush 23.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention but is not meant to be a limitation upon the practice thereof. The following claims, including all equivalents thereof, are intended to define the scope of the invention.

The invention claimed is:

1. A duct cleaning system comprising:

a flexible, coilable vacuum hose having a distal end and a proximal end and a first longitudinal axis extending therebetween, the proximal end of the vacuum hose configured to couple to a vacuum source;

a flexible, coilable drive shaft having a distal end and a proximal end and a second longitudinal axis extending therebetween, the proximal end of the drive shaft configured to couple to and be rotatably driven by a motor, the distal end of the drive shaft configured to couple to a cleaning attachment; and a flexible, coilable camera line having a distal end and a proximal end and a third longitudinal axis extending therebetween, the proximal end configured to couple to a power source, the distal end provided with a camera;

wherein the first longitudinal axis, the second longitudinal axis, and the third longitudinal axis are non-coaxial;

wherein the vacuum hose, the drive shaft, and the camera line are loosely coupled together by at least one slidable collar positioned between the distal end and the proximal end of each of the vacuum hose, the drive shaft, and the camera line;

wherein the distal end of the vacuum hose, the distal end of the drive shaft, and the distal end of the camera line are configured to be fed into and independently moved along a duct to be cleaned, and wherein the vacuum hose delivers a vacuum to the duct to be cleaned, the drive shaft and cleaning attachment rotate within the duct to be cleaned, and the camera line provides visualization of the duct to be cleaned; and wherein each of the vacuum hose, the drive shaft, and the camera line are configured to be coiled around a first spool, a second spool, and a third spool, respectively, for storage and are configured to extend from the first spool, the second spool, and the third spool, respectively, in use, the first spool, the second spool, and the third spool being arranged in parallel and coaxial with one another within an enclosed volume of a carrying case with backpack straps.

2. The duct cleaning system of claim 1 wherein the vacuum source is a portable vacuum machine.

3. The duct cleaning system of claim 1 further comprising a vacuum nozzle or a vacuum brush configured to attach to the distal end of the vacuum hose.

4. The duct cleaning system of claim 1 wherein the vacuum hose has a length from the distal end to the proximal end of 20 to 100 feet.

5. The duct cleaning system of claim 1 further comprising a vacuum hose steering line attached to the distal end of the vacuum hose that is configured to steer the direction of the distal end of the vacuum hose based on force applied to the steering line near the proximal end of the vacuum hose.

6. The duct cleaning system of claim 1 wherein the motor that drives the drive shaft is a handheld drill configured to couple to the proximal end of the drive shaft.

7. The duct cleaning system of claim 1 wherein the drive shaft has a length from the distal end to the proximal end of 20 to 100 feet.

8. The duct cleaning system of claim 1 further comprising a sheath in which the drive shaft is provided and in which the drive shaft is free to rotate.

9. The duct cleaning system of claim 1 further comprising a drive shaft steering line attached to the distal end of the drive shaft that is configured to steer the direction of the distal end of the drive shaft based on force applied to the steering line near the proximal end of the drive shaft.

10. The duct cleaning system of claim 1 wherein the cleaning attachment is a brush.

11. The duct cleaning system of claim 1 wherein the cleaning attachment is a double worm screw.

12. The duct cleaning system of claim 1 wherein the cleaning attachment is a scraper.

13. The duct cleaning system of claim 1 wherein the camera line has a length from the distal end to the proximal end of 20 to 100 feet.

14. The duct cleaning system of claim 1 wherein the distal end of the camera line is additionally provided with a light configured to illuminate the duct to be cleaned.

15. The duct cleaning system of claim 1 wherein the power source to which the proximal end of the camera line is coupled is a portable computing device.

16. The duct cleaning system of claim 1 wherein the power source to which the proximal end of the camera line is coupled includes a screen configured to display the duct to be cleaned.

17. The duct cleaning system of claim 1 further comprising a camera line steering line attached to the distal end of the camera line that is configured to steer the direction of the distal end of the camera line based on force applied to the steering line near the proximal end of the camera line.

18. The duct cleaning system of claim 1 wherein the vacuum hose, the drive shaft, and the camera line are each separately provided in one of a first color, a second color, and a third color, respectively, wherein each of the first color, the second color, and the third color are visually distinct from one another.

19. The duct cleaning system of claim 1 wherein the carrying case is configured to contain the vacuum hose, the drive shaft and motor, and the camera line and the power source.

20. The duct cleaning system of claim 1 wherein the first spool around which the vacuum line is configured to be coiled is positioned between the second spool and the third spool.

* * * * *